United States Patent [19]

Schiffman

[11] Patent Number: 5,061,996
[45] Date of Patent: Oct. 29, 1991

[54] GROUND VEHICLE HEAD UP DISPLAY FOR PASSENGER

[75] Inventor: Julius Schiffman, Huntington Woods, Mich.

[73] Assignee: Autovision Associates, Bloomfield Hills, Mich.

[21] Appl. No.: 515,852

[22] Filed: Apr. 27, 1990

Related U.S. Application Data

[62] Division of Ser. No. 373,788, Jun. 29, 1989.

[51] Int. Cl.⁵ .............................................. H04N 7/18
[52] U.S. Cl. .................................... 358/103; 358/250; 340/705; 340/980; 359/630
[58] Field of Search ................. 358/103, 250, 103, 93; 350/174; 340/980, 705

[56] References Cited

U.S. PATENT DOCUMENTS

| | | | |
|---|---|---|---|
| 4,635,033 | 1/1987 | Inukai et al. | 340/980 X |
| 4,740,780 | 4/1988 | Brown et al. | 340/705 |
| 4,790,613 | 12/1988 | Moss | 350/174 X |
| 4,831,336 | 5/1989 | Iino | 340/980 X |
| 4,832,427 | 5/1989 | Namba et al. | 350/174 X |
| 4,837,551 | 6/1989 | Iino | 340/705 |
| 4,876,594 | 10/1989 | Schiffman | 358/103 |
| 4,884,135 | 11/1989 | Schiffman | 358/103 |
| 4,908,611 | 3/1990 | Iino | 340/980 |

Primary Examiner—Victor R. Kostak
Attorney, Agent, or Firm—Krass & Young

[57] ABSTRACT

A ground vehicle heads up display includes a video program source and a display device for producing a set of visual images corresponding to the video program. A mirror, preferably disposed on the vehicle windshield, reflects an image of the display device to the passenger. This mirror is preferably above the line of sight to the road ahead. The mirror may be monocular, reflecting the image to only one eye of the passenger, or it may be binocular, reflecting the image to both eyes. The heads up display may optionally include an additional mirror located slightly above the normal line of sight of the driver toward the direction of travel, having a size which is a small fraction of the windshield area for reflecting an image of the display device to at least one eye of the driver.

10 Claims, 3 Drawing Sheets

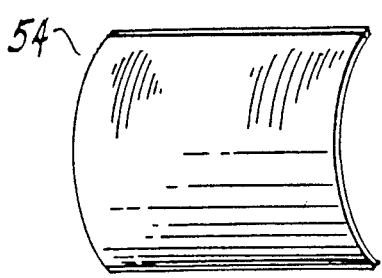
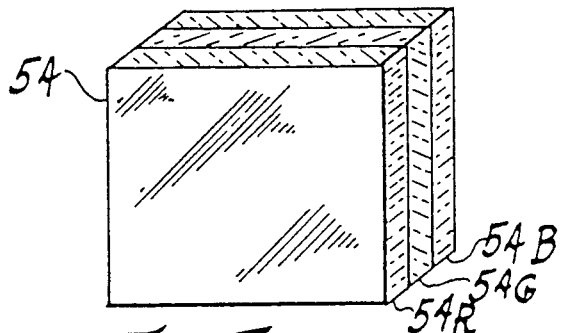
Fig. 2
Fig. 3
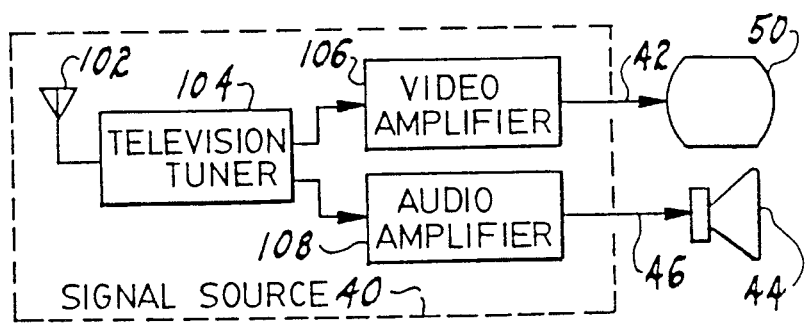
Fig. 4
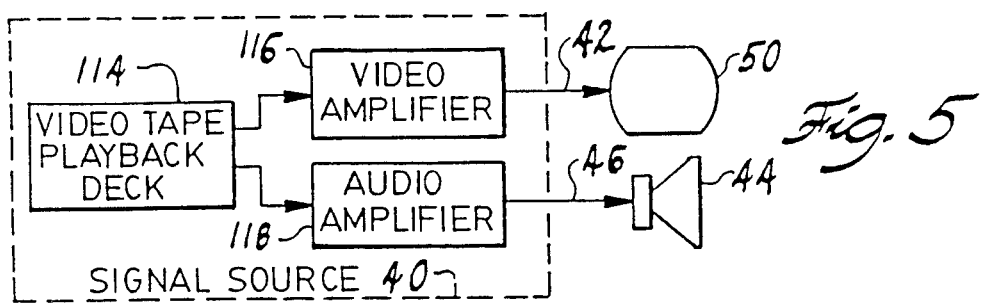
Fig. 5
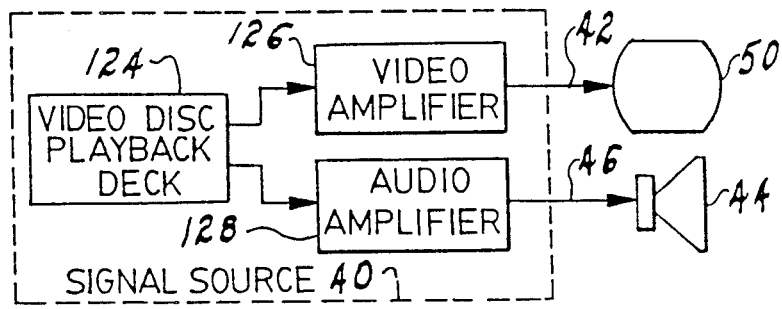
Fig. 6

GROUND VEHICLE HEAD UP DISPLAY FOR PASSENGER

This application is a division of Ser. No. 373,788, filed June 29, 1989.

TECHNICAL FIELD OF THE INVENTION

The technical field of the present invention is head up displays for vehicles, and in particular head up displays for ground vehicles (such as automobiles) of the type described in U.S. Pat. No. 4,742,389.

BACKGROUND OF THE INVENTION

My prior U.S. Pat. No. 4,742,389 entitled "Apparatus for Promoting the Vigilance of a Motor Vehicle Operator" taught a technique for display of a video program of moving visual images to the driver of a ground vehicle while operating the ground vehicle. In accordance with the teachings of that patent, the visual display, having a size which is a small fraction of the total windshield area, is presented on the windshield of an automobile at a position slightly above the line of sight of the driver toward the direction of travel of the automobile. This does not interfere with the visual task of operating the automobile. On the contrary, it has been found that in some occasions this display actually enhances the attention of the driver to the visual task of operating the automobile.

SUMMARY OF THE INVENTION

The present invention is an apparatus for use in a ground vehicle having a windshield through which the driver can see conditions in the direction of travel of the ground vehicle. This invention includes a video program source and a display device for producing a set of visual images. The video program source can be an entertainment source such as a broadcast television receiver, a video tape player or a video disc player. In the preferred embodiment the ground vehicle is an automobile.

A mirror is disposed on the windshield of the automobile at a position slightly above the normal line of sight of the passenger. This mirror has a size which is a small fraction of the windshield area. This mirror is disposed in a location to reflect an image of the display device to at least one eye of the driver. This second mirror may be employed in conjunction with the driver side mirror or alone. This mirror permits the passenger to view the video program. This mirror may be monocular. Alternatively, this second mirror may be of a size greater than the interpupillary distance enabling the passenger to view the display with both eyes. The apparatus may optionally include another mirror reflecting an image of the display device to the driver as taught in my prior U.S. Pat. No. 4,742,389.

BRIEF DESCRIPTION OF THE DRAWINGS

These and other objects and aspects of the present invention will become clear from the following description in conjunction of the drawings in which:

FIG. 2 illustrates a perspective view of a curved mirror which may be employed in the present invention;

FIG. 3 illustrates a perspective view of a mirror formed of compound holographic optical elements which may be employed in the present invention;

FIG. 4 illustrates in block diagram form a broadcast television receiver which may form the signal source of the present invention;

FIG. 5 illustrates in block diagram form a video tape player which may form the signal source of the present invention;

FIG. 6 illustrates in block diagram form a video disc player which may form the signal source of the present invention;

DETAILED DESCRIPTION OF THE PREFERRED EMBODIMENTS

Figure 1:
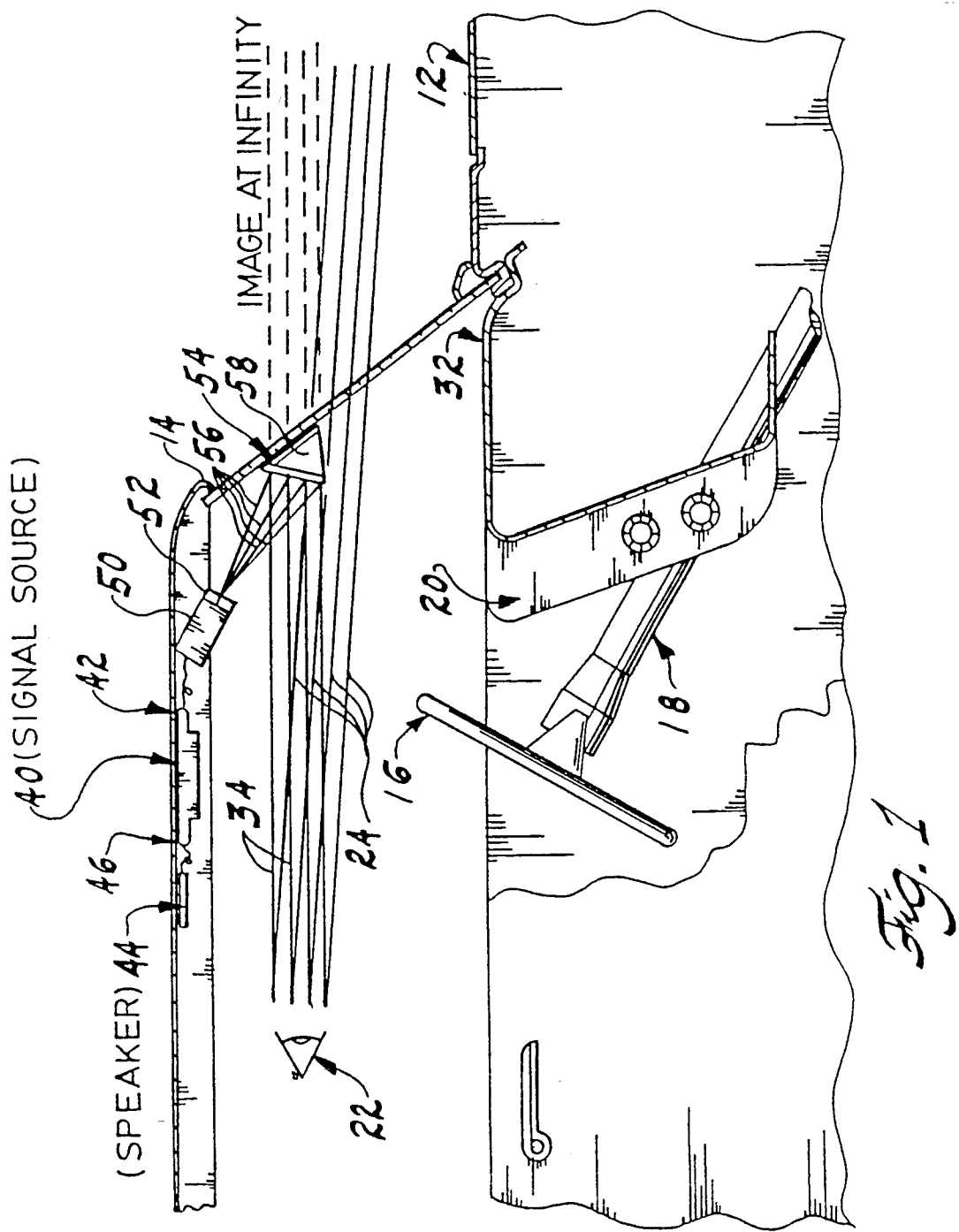
FIG. 1 is a schematic drawing of the present invention disposed in an automobile.

FIG. 1 illustrates in schematic form the invention disposed in an automobile. FIG. 1 shows an automobile having a forward body panel 12, a relatively transparent windshield 14 made of glass, plastic, or other similar material, and a steering wheel 16. The steering wheel 16 is attached to a steering column 18 which passes forward through a dash panel 20. Disposed below the windshield 14 is a dash board 32.

The driver's eyes 22 are located at some relatively unchanging position with respect to the components of the automobile just mentioned. The view of driving conditions ahead of the automobile are presented to the driver's eyes 22 by means of light rays 24, which are shown as cast at a slight downward angle toward the pavement upon which the automobile is traveling. The light rays 24 composing the scene ahead of the automobile pass through windshield 14 virtually undistorted.

A video program source 40 produces a video program and optionally an accompanying audio program. The video program is coupled to display device 50 via a cable 42. Display device 50 is preferably a color cathode ray tube. The audio program is coupled to speaker 44 via a cable 46. Those skilled in the art would recognize that speaker 44 need not be disposed in the ceiling of the vehicle. Speaker 44 can be disposed in any location within the passenger cabin of the vehicle likely to permit the passengers to hear its sound output.

A diverging wave front of rays 56 of display device 50 is directed toward a mirror 54, which is mounted via mirror mount unit 58 onto a portion of windshield 14. In accordance with the teachings of U.S. Pat. No. 4,742,389, mirror mount unit 58 is disposed so that mirror 54 is located slightly above the line of sight of the driver toward the direction of travel of the automobile. In addition, mirror 54 is so sized as to utilize no more than a small fraction of the total windshield area. In accordance with the present invention, the width of mirror 54 is less than the distance between the pupils of the driver's eyes, the interpupillary distance. In addition, mirror 54 must have a height and width with relation to the distance from the driver's eye 22 to mirror 54, the distance from mirror 54 to the display device 50, and the size of display device 50 so that an image of display device 50 is presented to only one eye. As an example, a rectangular mirror 54 having dimensions of approximately 2.5 inches wide by 1.6 inches high has been found suitable for use with a mid-sized automobile based upon the distance from the windshield 14 to the driver's eyes 22. FIG. 1 further illustrates hood 52, whose character and purpose will be further explained below.

In accordance with the preferred embodiment of the present invention, mirror 54 has optical power in order to present an image to the driver's eyes 22 via rays 34 which appears focused near visual infinity or at visual infinity. The provision of an image near or at visual infinity permits the driver to shift his attention from the mirror 54 to the view of traffic conditions ahead of the vehicle without a great change in the focus of his eyes. This enhances the safety of the apparatus of this invention.

There are two techniques contemplated for providing this optical power. The optical power can be achieved through the use of a curved reflecting mirror. In this case the curvature must be selected to provide the desired image to the driver's eye as illustrated in FIG. 2. Alternatively, the optical power can be achieved through the use of a flat holographic optical element. In this case the holographic optical element must have the proper diffraction pattern to achieve the necessary optical power. Such holographic optical elements are wave length dependent. However, the phosphors used in the color cathode ray tube have known colors. Therefore a compound holographic optical element can be constructed having the same optical power for each phosphor color such as the three holographic optical elements 54R, 54G, and 54B illustrated in FIG. 3.

A collimated image may be produced without using a mirror having optical power. One or more lenses may be employed in the optical path, either between the display and the mirror or between the mirror and the eye of the user, or both. The essential point is that the rays reaching the driver's eye form a virtual image which appears focused at some distance approximating visual infinity.

In accordance with the present invention, signal source 40 could constitute an entertainment source or a source related to the operation of the ground vehicle. Examples of entertainment sources include: a broadcast television receiver capable of receiving a broadcast television program including antenna 102, television tuner 104, video amplifier 106 and audio amplifier 108 as illustrated in FIG. 4; a video tape player including video tape playback deck 114, video amplifier 116 and audio amplifier 118 as illustrated in FIG. 5; a video disc player including video disc playback deck 124, video amplifier 126 and audio amplifier 128 as illustrated in FIG. 6; each similarly capable of producing a combined video and audio program. Examples of sources related to the operation of the ground vehicle include map displays corresponding to the intended travel path of the ground vehicle, and various instrument readings concerning the operation of the ground vehicle. Signal source 40 may also include the views of one or more television cameras, such as a camera disposed to view conditions behind the ground vehicle or a camera disposed to cover a blind spot of the driver of the ground vehicle. The essential point is that signal source 40 generate at least one video signal which can be viewed by the driver via the reflected image appearing in mirror 54.

Figure 7:
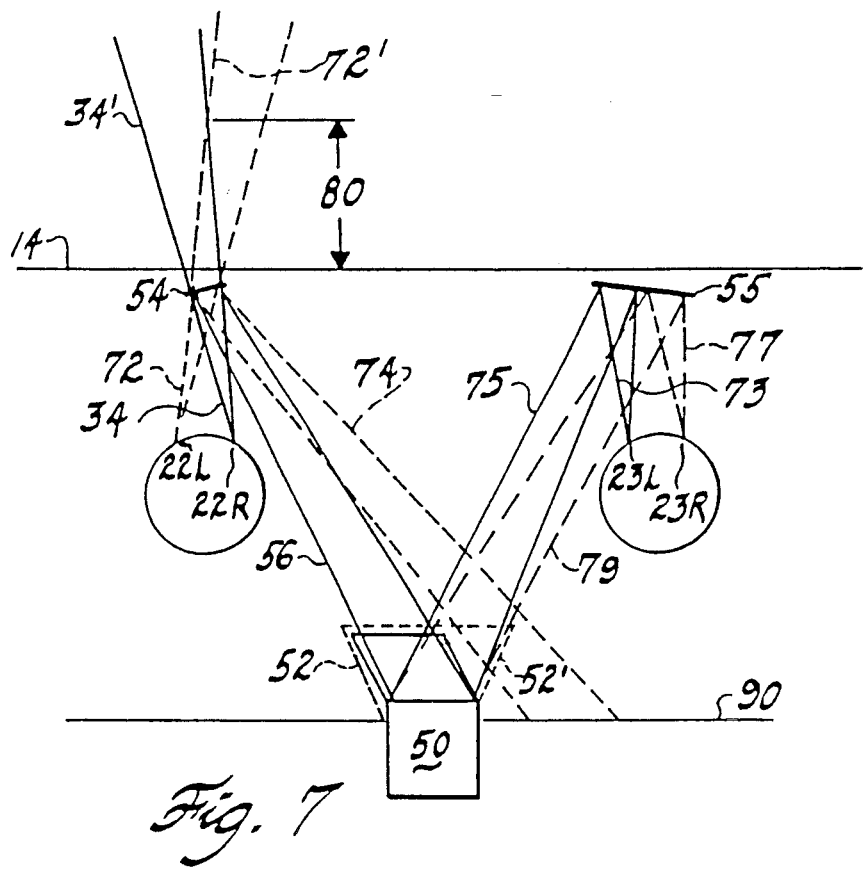
FIG. 7 is a schematic drawing of the optical paths related to the mirrors of the present invention.

FIG. 7 illustrates the optical system schematically. Right eye 22R and left eye 22L of the driver are disposed at a relatively unchanging distance from windshield 14. FIG. 7 illustrates the mirror 54 adjusted to reflect an image of the display device 50 via rays 56 and rays 34 to only right eye 22R. Mirror 54 is of such a size that it reflects an image of background 90 via rays 74 and rays 72 to left eye 22L.

Display device 50 is shown laterally displaced from the position of the driver. The driver is typically seated in the left portion of the front seat of the vehicle. It has been found that there is typically more space to accommodate the display device 50 in the central portion of the vehicle ceiling. Placing display device 50 at this location requires mirror 54 to be slightly turned to properly reflect the image of display device 50 to the eye 22R of the driver. It is also contemplated that the location of display device 50 will be slightly higher than the location of the eye 22 of the driver, requiring a slight upward tilt in mirror 54. The essential point is that mirror 54 is disposed slightly above the view of the driver to traffic conditions ahead of the vehicle and is oriented to reflect an image of display device 50.

In accordance with the present invention, mirror 54 has a size relative to the optics of the system to prevent reflection of an image of display device 50 to left eye 22L. As illustrated in FIG. 7, if the driver were to view mirror 54 with left eye 22L, the driver would see an image of the background 90 surrounding the display device 50 via rays 74 and 72. The driver could only see an image of display device 50 in mirror 54 if the mirror were extended to the left.

The particular size of mirror 54 needed to reflect an image of all of display device 50 to right eye 22R without reflecting an image of any of display device 50 to left eye 22L depends on the particular geometry of the installation. Features in the geometry effecting this size include the total optical path distance from the eyes of the driver to display device 50, the distance from mirror 54 to the eyes of the driver, and the size of display device 50. This invention relies on the fact that the two eyes of the driver have different viewing paths to the display device 50 (parallax). Complete separation of these optical paths sets a maximum size of display device 50 relative to the geometry of the apparatus.

FIG. 7 illustrates another advantageous feature of constructing mirror 54 having a width less than the interpupillary distance. Projected rays 34' define the cone of view of right eye 22R blocked by mirror 54. Likewise, projected rays 72' define the cone of view of left eye 22L blocked by mirror 54. Because mirror 54 has a width less than the interpupillary distance between left eye 22L and right eye 22R, there is a distance 80 beyond which these obstructed view cones no longer coincide. This means for an object located further from windshield 14 than distance 80, mirror 54 cannot simultaneously block the view of both eyes to the object. By proper selection of the width of mirror 54, this distance 80 can be made on the order of a car length. Objects closer to the vehicle than such a distance would likely have an angular extent preventing complete blockage by mirror 54, even if some parts would be completely blocked to both eyes. Objects located further than this distance will always be visible in at least one eye. Thus the driver's view of conditions outside the vehicle is less obstructed by a mirror having a width in accordance with the present invention.

The most likely objects to be blocked by mirror 54 are traffic signals or overhead road signs. These are the most likely to be blocked because mirror 54 is disposed slightly above the normal line of sight toward developing traffic conditions. Overhead road signs will generally not be a problem to view because they are typically viewed while the vehicle is moving. Thus such signs will normally not remain at the angle blocked by mirror 54 for long. Traffic signals are often viewed while stopped and thus may remain at a position obscured by mirror 54 for some time. Thus the size of mirror 54 of the present invention insures that traffic signals will always be visible to at least one eye. A typical driver will find that either his attention will be directed to the eye which cannot view the projected image enabling the traffic signal to be seen, or that he will see the traffic signal superimposed over the projected image. In either case the driver will be able to see the traffic signal.

FIG. 7 illustrates a further feature of the present invention. A mirror 55 is disposed on the windshield 14 in front of the eyes 23L and 23R of a passenger in the vehicle. Mirror 55 may be mounted in the same position relative to the head of the passenger 23 as mirror 54 is in relation to driver 22, that is, slightly above the normal line of sight toward developing traffic conditions. This position is not required for mirror 55 as is the case for mirror 54, because the passenger's attention to the road is less critical to the operation of the vehicle. Mirror 55 could be constructed of the same size as mirror 54, thus permitting the passenger to view an image of display device 50 with only a single eye. It is also possible to construct mirror 55 larger than the interpupillary distance in a manner permitting the passenger to view display device 50 with both eyes. As illustrated in FIG. 7, the passenger may view display device 50 via left eye 23L along rays 73 and 75 and via the right eye 23R along rays 77 and 79. This requires a larger mirror because the image to the eyes 23L and 23R are reflected by separate sections of mirror 55. A larger mirror in this location is not objectionable because the passenger's view of the traffic conditions outside the vehicle is not critical to the safe operation of the vehicle.

It is preferable to provide a collimated image to the passenger. This can be achieved in any manner previously discussed for presenting a collimated image to the driver. The presentation of such a collimated image is not as critical for the passenger as for the driver, because it is less critical that the passenger be able to quickly change attention from the image to conditions outside the vehicle. Thus this feature need not be implemented in the present invention.

FIG. 7 further illustrates hood 52. Hood 52 is disposed in front of display device 50. Hood 52 serves to reduce the chance of ambient light falling directly on display device 50. Such direct ambient light would undesirably reduce the contrast of the display to the driver. Note that hood 52 is slanted to accommodate the optical path from display device 50 to mirror 54. This slant is dependent upon the lateral displacement of display device 50 and the total optical path distance from the driver to display device 50. FIG. 7 illustrates in dashed lines the construction of an alternative hood 52'. This alternative construction is employed when the apparatus includes mirror 55 to enable the passenger to view display device 50.

Figure 8:
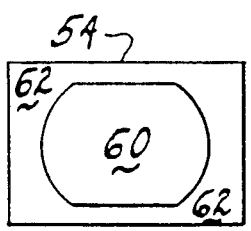
FIG. 8 illustrates the use of the primary mirror of the present invention to reflect an image of the display device to the left eye of the user.
Figure 9:
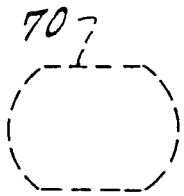
FIG. 9 illustrates the use of the primary mirror of the present invention to reflect the image to the right eye of the user.
Figure 9:
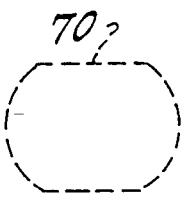
Figure 9:
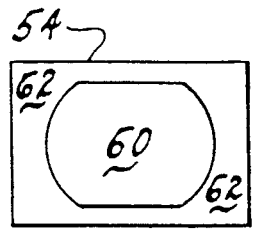

FIGS. 8 and 9 illustrate the alternative results of the proper sizing of mirror 54. FIG. 8 illustrates the presentation of image 60 of the display device 50 via mirror 54 to the left eye of the user. Although the optical power of mirror 54 can present an image focused near or at visual infinity to the eye of the driver, it cannot compensate for the parallax due to the different position of the two eyes of the driver. The image of the display device 50 to the right eye would have appeared at image 70 in FIG. 8, however mirror 54 is so sized as to not reflect this image 70 of display device 50 to the right eye of the driver. Therefore, the mirror 54 displays this image to only the left eye of the user.

FIG. 8 further illustrates that mirror 54 is slightly larger in size than needed to reflect an image 60 of display device 50. This excess size results in reflection of an image 62 of portions of background 90 surrounding display device 50. This excess in the size of mirror 54 over that necessary to produce an image 60 of the whole display device 50 permits the apparatus to accommodate slight movements of the driver's head and eyes without requiring change in the angle of mirror 54. Note that there is a greater excess size of mirror 54 in the horizontal dimension than in the vertical dimension. This is because it is expected that the driver will make horizontal movements of his eye to a greater degree than vertical movements. By this means, the driver can change the position of his head relative to mirror 54 to a small degree without needing to adjust mirror 54 to view display device 50.

Similarly, FIG. 9 illustrates reflection via mirror 54 of image 60 of display device 50 to the right eye of the driver. In a manner similar to that described above in conjunction with FIG. 8, the image of display device 50 would have appeared at image 70 with respect to the left eye of the driver. However, because the mirror 54 does not exist at this position, this image 70 is not reflected to the left eye of the driver. FIG. 9 also illustrates reflection of an image 62 of background 90 surrounding the image 60 of display device 50.

Selection of the eye of the driver which receives the reflected image 60 of display device 50 is dependent upon the horizontal angle of mirror 54. A slight change in this angel can change from the situation illustrated in FIG. 8, to the situation illustrated in FIG. 9, or vice versa. Some drivers will find it more comfortable to set mirror 54 for reflection of the image to their left eye. Other drivers will find that it is preferable to view the image with their right eye. This selection would ordinarily be dependent upon which is the dominant eye, the eye which is favored in the brain's image formation. The present invention enables the selected eye to be readily changed by a slight adjustment in the angle of mirror 54.

Figure 10:
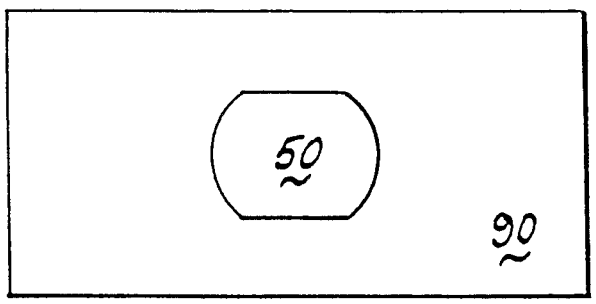
FIG. 10 illustrates the use of a background material surrounding the image display device.

FIG. 10 illustrates the provision of a background 90 surrounding the display device 50. Background 90 is preferably of some dark, unornamented material having no visual features. As explained above in conjunction with FIGS. 8 and 9, mirror 54 is slightly larger than necessary to reflect an image of display device 50, resulting in reflection of an image 62 surrounding display 54. In addition mirror 54 is sized so as to reflect an image of display device 50 to only a single eye of the user. However, the mirror 54 does reflect an image of something to the opposite eye of the user. In the case of the structure illustrated in FIG. 10, the reflected image 62 surrounding the image 60 and this "something" reflected to the other eye is the background 90. This background 90 is preferably dark and visually uninteresting. Therefore, the attention of the driver is not captured by any reflection from mirror 54 other than display device 50 and the driver can successfully ignore any such reflection. Without such a background, it may in some situations be possible for the reflection of an image including objects outside the vehicle if, for example, the display device 50 were located relatively far back in the ceiling of the vehicle. In such an event, the driver's attention is liable to be captured by objects outside the vehicle which are reflected via mirror 54. This disadvantage is eliminated by the use of the background 90.

I claim:

1. An apparatus for use in a ground vehicle having a windshield through which the driver can view conditions in the direction of travel of the ground vehicle, the apparatus comprising:
   a program source for producing a video program;
   a display device connected to said program source for producing a set of visual images corresponding to said video program; and
   a mirror disposed in a location on the passenger's side of the ground vehicle, said mirror having a size and location to reflect an image of said display device to a passenger.

2. The apparatus claimed in claim 1, further comprising:
   an audio program source for producing an audio program corresponding to said video program; and
   a speaker connected to said audio program source and disposed within the ground vehicle for audibly reproducing said audio program.

3. The apparatus claimed in claim 2, wherein:
   said video program source and said audio program source consist of a broadcast television receiver.

4. The apparatus claimed in claim 2, wherein:
   said video program source and said audio program source consist of a video tape player.

5. The apparatus claimed in claim 2, wherein:
   said video program source and said audio program source consist of a video disc player.

6. The apparatus claimed in claim 1, wherein:
   said mirror is disposed on the windshield of the ground vehicle.

7. The apparatus claimed in claim 1, wherein:
   said mirror is disposed in a location slightly above the normal line of sight of the passenger toward the direction of travel of the ground vehicle.

8. The apparatus claimed in claim 1, wherein:
   said mirror has a width which is less than the interpupillary distance between the passenger's eyes, said mirror having a width and a height in relation to the size of said display device and the distance from the passenger to said mirror to reflect an image of the entirety of said display device to only one eye of the passenger and not to reflect an image of any of said display device to the other eye of the passenger.

9. The apparatus claimed in claim 1, wherein:
   said mirror has a width which is greater than the interpupillary distance between the passenger's eyes, said mirror having a width and a height in relation to the size of said display device and the distance from the passenger to said mirror to reflect an image of the entirety of said display device to each eye of the passenger.

10. The apparatus of claim 1, further comprising:
    a second mirror disposed in a location slightly above the normal line of sight of the driver toward the direction of travel of the ground vehicle, said second mirror having a size which is a small fraction of the area of the windshield, said second mirror disposed on said windshield in a location to reflect an image of said display device to at least one eye of the driver.

* * * * *

UNITED STATES PATENT AND TRADEMARK OFFICE
CERTIFICATE OF CORRECTION

PATENT NO. : 5,061,996

DATED : October 29, 1991

INVENTOR(S) : Schiffman

It is certified that error appears in the above-identified patent and that said Letters Patent is hereby corrected as shown below:

Column 6, line 41, replace "angel" with --angle--.

Signed and Sealed this

Second Day of March, 1993

*Attest:*

STEPHEN G. KUNIN

*Attesting Officer*  Acting Commissioner of Patents and Trademarks